US012669809B2

(12) United States Patent
Jin et al.

(10) Patent No.: US 12,669,809 B2
(45) Date of Patent: Jun. 30, 2026

(54) METHOD FOR CONTROLLING TRANSIT OF YARN SPINDLE, ELECTRONIC DEVICE AND STORAGE MEDIUM

(71) Applicants: ZHEJIANG HENGYI PETROCHEMICAL CO., LTD., Zhejiang (CN); JIAXING YIPENG CHEMICAL FIBER CO., LTD., Jiaxing City (CN)

(72) Inventors: Junliang Jin, Zhejiang (CN); Xiantao Peng, Zhejiang (CN); Yibo Qiu, Zhejiang (CN); Jiangang Chen, Zhejiang (CN); Rongwei Kong, Zhejiang (CN); Yaobin Zhang, Zhejiang (CN)

(73) Assignees: ZHEJIANG HENGYI PETROCHEMICAL CO., LTD., Zhejiang (CN); JIAXING YIPENG CHEMICAL FIBER CO., LTD., Jiaxing City (CN)

( * ) Notice: Subject to any disclaimer, the term of this patent is extended or adjusted under 35 U.S.C. 154(b) by 0 days.

(21) Appl. No.: 19/197,318

(22) Filed: May 2, 2025

(65) Prior Publication Data

US 2026/0093242 A1 Apr. 2, 2026

(30) Foreign Application Priority Data

Sep. 29, 2024 (CN) .......................... 202411378835.0

(51) Int. Cl.
G05B 19/418 (2006.01)
H04L 43/106 (2022.01)
(52) U.S. Cl.
CPC ........ G05B 19/4185 (2013.01); H04L 43/106 (2013.01); G05B 2219/45193 (2013.01)

(58) Field of Classification Search
CPC ........................................... G05B 2219/45193
(Continued)

(56) References Cited

U.S. PATENT DOCUMENTS 5,046,013 A * 9/1991 Ueda ...................... B65H 63/00
57/264
5,083,071 A * 1/1992 Sasaki ................ G05B 19/4144
700/181
(Continued)

FOREIGN PATENT DOCUMENTS

CN 110161950 A 8/2019
CN 110740072 A * 1/2020 ......... H04L 43/0817
(Continued)

OTHER PUBLICATIONS

Jiwei Hua et al., "The Design of Manufacturing Execution System Based on RFID", 2008 Workshop on Power Electronics and Intelligent Transportation System, IEEE, Piscataway. NJ, Aug. 8, 2008, pp. 8-11.
(Continued)

*Primary Examiner* — Grace Huang
(74) *Attorney, Agent, or Firm* — Perilla Knox Hildebrandt Staley & Amy LLP

(57) ABSTRACT

A method for controlling transit of a yarn spindle, and apparatuses are provided, relating to the field of computer and automatic control. The method includes: taking each second controller as a target controller, and receiving target business data sent by the target controller; sending the target business data to the manufacturing execution system, where the manufacturing execution system is configured to obtain a target transit indication based on the target business data, and send the target transit indication to the first controller; receiving the target transit indication sent by the manufacturing execution system; and sending the target transit indication to the target controller in a case of a communi- (Continued)

MES
MES

PLC
First controller

PLC
Second controller

PLC
Second controller

Yarn spindle Yarn spindle
workstation workstation

Yarn spindle Yarn spindle
workstation workstation cation link from the first controller to the target controller is in a normal state; where the target controller is configured to carry on the transit control operation for the yarn spindle product transiting the target workstation.

9 Claims, 4 Drawing Sheets

(58) Field of Classification Search
USPC ........................................................ 700/139
See application file for complete search history.

(56) References Cited

U.S. PATENT DOCUMENTS

| | | | | |
|---|---|---|---|---|
| 5,124,928 A * | 6/1992 | Aemmer | ................ | B65H 63/00 |
| | | | | 73/160 |
| 5,127,140 A * | 7/1992 | Oiwa | .................... | B23Q 39/048 |
| | | | | 700/169 |
| 5,181,178 A * | 1/1993 | Sasaki | .................. | G05B 19/182 |
| | | | | 700/169 |
| 5,189,624 A * | 2/1993 | Barlow | .............. | G05B 19/4065 |
| | | | | 700/169 |
| 5,224,047 A * | 6/1993 | Kitagawa | ............... | D01H 13/14 |
| | | | | 57/264 |
| 5,243,534 A * | 9/1993 | Takahashi Yoshikatsu | ................. | |
| | | | | G05B 19/182 |
| | | | | 700/169 |
| 5,347,449 A * | 9/1994 | Meyer | .................... | D01H 13/14 |
| | | | | 57/264 |
| 5,359,270 A * | 10/1994 | Kawamura | ........ | G05B 19/4141 |
| | | | | 700/169 |
| 6,363,477 B1 * | 3/2002 | Fletcher | ................ | H04L 43/106 |
| | | | | 713/153 |
| 6,381,511 B1 * | 4/2002 | Hermanns | .............. | B65H 54/22 |
| | | | | 57/264 |
| 6,556,885 B2 * | 4/2003 | Hosel | ................... | D01G 31/006 |
| | | | | 112/155 |
| 6,574,526 B1 * | 6/2003 | Gaukler | .................... | D01H 4/44 |
| | | | | 700/139 |
| 6,807,457 B2 * | 10/2004 | Natali | .................. | D03D 51/007 |
| | | | | 139/1 R |
| 9,585,175 B2 * | 2/2017 | Sung | ................... | H04L 12/4633 |
| 9,631,299 B2 * | 4/2017 | Maleck | .................... | D01H 7/00 |
| 11,524,380 B2 * | 12/2022 | Cheng | .................... | B23Q 15/08 |
| 11,604,456 B2 * | 3/2023 | Jalluri | ................ | G05B 19/4063 |
| 11,697,894 B2 * | 7/2023 | Kousalik | ............... | B65H 63/00 |
| | | | | 57/265 |
| 12,000,067 B2 * | 6/2024 | Zhang | .................. | G05D 1/0246 |
| 12,152,327 B2 * | 11/2024 | Atsumi | .................. | D05B 19/08 |
| 12,301,460 B1 * | 5/2025 | Ayoub | .................... | H04L 43/10 |
| 2023/0161332 A1 | 5/2023 | Chauvet et al. | | |
| 2023/0323571 A1 * | 10/2023 | Schmitt | .................. | G05B 15/02 |
| | | | | 57/265 |
| 2024/0171484 A1 * | 5/2024 | Muñoz De La Torre Alonso | ....... | |
| | | | | H04L 43/062 |
| 2025/0197108 A1 * | 6/2025 | Wang | ............... | G06Q 10/06311 |

FOREIGN PATENT DOCUMENTS

| | | | | | | |
|---|---|---|---|---|---|---|
| CN | | 110943878 A | * | 3/2020 | ............ | H04L 43/08 |
| CN | | 112849466 B | | 10/2022 | | |
| CN | | 115474184 A | | 12/2022 | | |
| CN | | 116125842 A | | 5/2023 | | |
| DE | | 19740307 A1 | | 3/1999 | | |

OTHER PUBLICATIONS

Extended European Search Report dated Dec. 2, 2025 in European Patent Application No. 25184446.0.

* cited by examiner

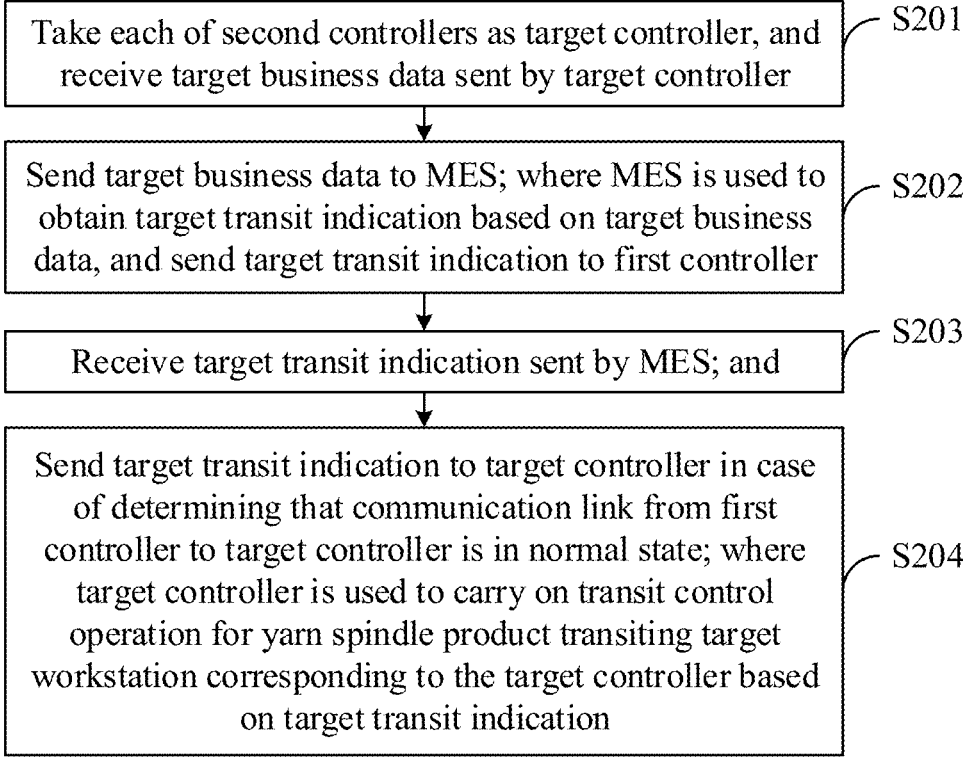

Take each of second controllers as target controller, and receive target business data sent by target controller — S201

Send target business data to MES; where MES is used to obtain target transit indication based on target business data, and send target transit indication to first controller — S202

Receive target transit indication sent by MES; and — S203

Send target transit indication to target controller in case of determining that communication link from first controller to target controller is in normal state; where target controller is used to carry on transit control operation for yarn spindle product transiting target workstation corresponding to the target controller based on target transit indication — S204

Apparatus for controlling transit of yarn spindle

Business data receiving unit — 401

Business data sending unit — 402

Transit indication receiving unit — 403

Transit indication sending unit — 404

Memory — 501

Processor — 502

Communication interface — 503

METHOD FOR CONTROLLING TRANSIT OF YARN SPINDLE, ELECTRONIC DEVICE AND STORAGE MEDIUM

CROSS-REFERENCE TO RELATED APPLICATIONS

The present application claims priority to Chinese Patent Application No. CN202411378835.0, filed with the China National Intellectual Property Administration on Sep. 29, 2024, the disclosure of which is hereby incorporated herein by reference in its entirety.

TECHNICAL FIELD

The present disclosure relates to the field of computer and automatic control, particularly to method and apparatus for controlling transit of a yarn spindle, an electronic device and a storage medium.

BACKGROUND

During a production process of a yarn spindle product, building an efficient assembly line is an essential core link to ensure production capacity and production efficiency. On the assembly line, there is a plurality of closely connected and highly coordinated yarn spindle workstations, each of which is responsible for a task of carrying out a specific production operation on the yarn spindle product. Ensuring that the yarn spindle product can flow efficiently and accurately and/or making a decision on whether to release the yarn spindle product to the next spindle workstation when the yarn spindle product is transiting the yarn spindle workstation are/is a key to maintain efficiently operating of the assembly line.

SUMMARY

The present disclosure provides detection method and apparatus, a device and a storage medium for solving one or more technical problems in the prior art.

As a first aspect, the present disclosure provides a method for controlling transit of a yarn spindle, applied to a first controller included in a system for controlling transit of the yarn spindle, the system for controlling transit of the yarn spindle further includes a manufacturing execution system in communication with the first controller and a plurality of second controllers, where each of the plurality of second controller has a corresponding yarn spindle workstation for obtaining business data related to the yarn spindle workstation, and carries on a transit control operation for a yarn spindle product transiting the yarn spindle workstation; and the method includes:

taking each of the plurality of second controllers as a target controller, and receiving target business data sent by the target controller;

sending the target business data to the manufacturing execution system; where the manufacturing execution system is configured to obtain a target transit indication based on the target business data, and send the target transit indication to the first controller;

receiving the target transit indication sent by the manufacturing execution system; and sending the target transit indication to the target controller in a case of determining that a communication link from the first controller to the target controller is in a normal state; where the target controller is configured to carry on the transit control operation for the yarn spindle product transiting the target workstation corresponding to the target controller based on the target transit indication.

As a second aspect, the present disclosure provides an apparatus for controlling transit of a yarn spindle, applied to a first controller included in a system for controlling transit of the yarn spindle, the system for controlling transit of the yarn spindle further includes a manufacturing execution system in communication with the first controller and a plurality of second controllers, where each of the plurality of second controllers has a corresponding yarn spindle workstation for obtaining business data related to the yarn spindle workstation, and carries on a transit control operation for a yarn spindle product transiting the yarn spindle workstation; and the apparatus includes:

a business data receiving unit configured to take each of the plurality of second controllers as a target controller, and receive target business data sent by the target controller;

a business data sending unit configured to send the target business data is sent to the manufacturing execution system; where the manufacturing execution system is configured to obtain a target transit indication based on the target business data, and send the target transit indication to the first controller;

a transit indication receiving unit configured to receive the target transit indication sent by the manufacturing execution system; and a transit indication sending unit configured to send the target transit indication to the target controller in a case of determining that a communication link from the first controller to the target controller is in a normal state; where the target controller is configured to carry on the transit control operation for the yarn spindle product transiting the target workstation corresponding to the target controller based on the target transit indication.

As a third aspect, an electronic device is provided, which includes:

at least one processor; and a memory connected in communication with the at least one processor, where the memory stores an instruction executable by the at least one processor, and the instruction, when executed by the at least one processor, enables the at least one processor to execute the method of any of the embodiments of the present disclosure.

As a fourth aspect, a non-transitory computer-readable storage medium storing a computer instruction thereon is provided, where the computer instruction is used to cause a computer to execute the method of any of the embodiments of the present disclosure.

Adopting the technical solution provided by the present disclosure may ensure that a yarn spindle product can flow efficiently and accurately and/or make a decision on whether to release the yarn spindle product to the next spindle workstation when the yarn spindle product is transiting the yarn spindle workstation, to maintain efficiently operating of an assembly line.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, same or similar components or elements are represented by same reference numerals throughout the accompanying drawings, unless otherwise specified. The accompanying drawings may not necessarily be drawn to scale. It should be understood that the accompanying drawings only depict some embodiments provided according to the present disclosure and should not be considered as limiting the scope of the present disclosure.

FIG. 2 is a flowchart diagram of a method for controlling transit of a yarn spindle provided by embodiments of the present disclosure.

DETAILED DESCRIPTION

Figure 1:
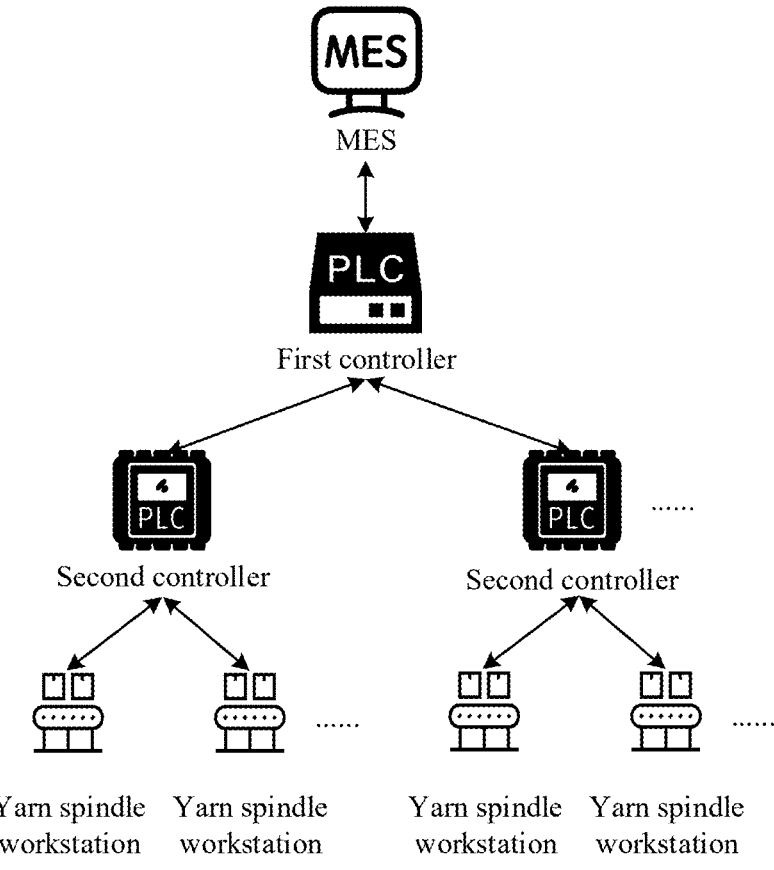
FIG. 1 is a schematic structural block diagram of a system for controlling transit of a yarn spindle provided by embodiments of the present disclosure.

Hereinafter the present disclosure is described in further detail below with reference to the accompanying drawings. The same reference numerals in the accompanying drawings indicate elements with the same or similar function. Although various aspects of embodiments are shown in the accompanying drawings, it is not necessary to draw the accompanying drawings to scale unless otherwise indicated.

In addition, in order to better illustrate the present disclosure, a number of specific details are given in specific implementations below. Those having skill in the art should understand that the present disclosure may also be implemented without certain specific details. In some examples, methods, means, components, circuits and the like which are well known to those having skill in the art are not described in detail, so as to highlight the main purpose of the present disclosure.

As described in the background, during a production process of a yarn spindle product, building an efficient assembly line is an essential core link to ensure production capacity and production efficiency. On the assembly line, there is a plurality of closely connected and highly coordinated yarn spindle workstations, each of which is responsible for a task of carrying out a specific production operation on the yarn spindle product. The plurality of yarn spindle workstations may include a weighing workstation for weighting the yarn spindle product, an external inspection workstation for carrying out intelligent external inspection on the yarn spindle product, a bagging workstation for bagging the yarn spindle product, and the like. Ensuring that the yarn spindle product can flow efficiently and accurately and/or making a decision on whether to release the yarn spindle product to the next spindle workstation when the yarn spindle product is transiting the yarn spindle workstation are/is a key to maintain efficiently operating of the assembly line. On these bases, for ensuring that the yarn spindle product can flow efficiently and accurately and/or making the decision on whether to release the yarn spindle product to the next spindle workstation when the yarn spindle product is transiting the yarn spindle workstation to maintain the efficiently operating of the assembly line, the embodiments of the present disclosure provide a method for controlling transit of a yarn spindle.

Before explaining the method for controlling the transit of the yarn spindle provided by the embodiments of the present disclosure, it should be noted that a main type of the yarn spindle product in the embodiments of the present application may include at least one of a partially oriented yarn (POY), a fully drawn yarn (FDY), a draw textured yarn (DTY, also known as a low elasticity yarn) and the like. For example, a type of the yarn spindle product may specifically include a polyester partially oriented yarn, a polyester fully drawn yarn, a polyester drawn yarn, a polyester draw textured yarn and the like.

Hereinafter, the method for controlling transit of the yarn spindle provided in the embodiments of the present disclosure will be explained in combination with FIGS. 1 and 2.

First, FIG. 1 is a schematic structural block diagram of a system for controlling transit of a yarn spindle provided by the embodiments of the present disclosure, the system includes a first controller, a manufacturing execution system (MES) in communication with the first controller, and a plurality of second controllers. The first controller may be a programmable logic controller (PLC), the second controllers may also be PLCs, the MES may be applied to a terminal device or a server. Here, the terminal device may be a workbench, a large computer, a conventional computer (such as a desktop computer, a laptop), or other similar computing devices.

In the embodiments of the present disclosure, each of the plurality of second controllers has a corresponding yarn spindle workstation (at least one in number) for obtaining business data related to the yarn spindle workstation. The business data may include a device state and quality control reference data obtained by a production control device during a production process of a yarn spindle product, and may further include a production progress. Here, the device state may include an operating state, a fault record, a maintenance condition and the like of the production control device. The quality control reference data may include a yarn spindle weight, a yarn spindle external inspection result and the like of the yarn spindle product. The production progress may include completion time of each production stage, a current production statistical result and the like. For example, if the yarn spindle workstation is a weighing workstation, the business data related to the weighing workstation may include the yarn spindle weight (belonging to the quality control reference data) obtained by a weighing sensor (belonging to the production control device) during the production process of the yarn spindle product. For example, if the yarn spindle workstation is the external inspection workstation, the business data related to the external inspection workstation may include the yarn spindle external inspection result (belonging to the quality control reference data) obtained by an external inspection device (belonging to the production control device) during the production process of the yarn spindle product.

For each of the plurality of second controllers, the second controller obtains the business data related to the yarn spindle workstation corresponding to itself and sends the business data to the first controller. The first controller then sends the business data to the MES. The MES may obtain a transit indication related to the yarn spindle workstation based on the business data and send the transit indication to the first controller. The first controller then sends the transit indication to the second controller, so that the second controller may carry on a transit control operation for the yarn spindle product transiting the yarn spindle workstation based on the transit indication. The transit control operation may be achieved through a transit control device (such as a yarn spindle diversion device, a transfer robot or the like) set at the yarn spindle workstation. The transit control operation is used to control flowing of the yarn spindle product transiting the yarn spindle workstation and/or control whether to release the yarn spindle product to the next spindle workstation (allowing or prohibiting transit of the yarn spindle product).

Please referring to FIG. 2, FIG. 2 is a flowchart diagram of the method for controlling transit of the yarn spindle provided by the embodiments of the present disclosure, which is applied to the first controller included in the system for controlling transit of the yarn spindle. In addition, it should be noted that although a logical sequence is shown in the flowchart, in some cases, the steps shown or described may also be executed in other orders.

At step S201, each of the plurality of second controllers is taken as a target controller, and target business data sent by the target controller is received by the first controller.

At least one yarn spindle workstation corresponding to the target controller includes a target workstation, and the target controller may obtain business data related to the target workstation. In the embodiments of the present disclosure, for ease of description, the business data related to the target workstation may be taken as the target business data.

At step S202, the target business data is sent by the first controller to the MES.

The first controller may establish a communication link with the MES through a network or management interface (MI) communication manner. After receiving the target business data sent by the target controller, the first controller may convert the target business data according to a preset data format to obtain the format-converted target business data that can be processed by the MES, and send the format-converted target business data to the MES.

In addition, in the embodiments of the present disclosure, the MES is used to obtain a target transit indication based on the target business data (e.g., the format-converted target business data), and send the target transit indication to the first controller. The target transit indication is used to instruct the target controller to carry on the transit control operation for the yarn spindle product transiting the target workstation.

At step S203, the target transit indication sent by the MES is received by the first controller.

At step S204, the target transit indication is sent to the target controller in a case of determining that a communication link from the first controller to the target controller is in a normal state.

The target controller is used to carry on the transit control operation for the yarn spindle product transiting the target workstation based on the target transit indication. Here, the transit control operation may be achieved through the transit control device set at the target workstation corresponding to the target controller. The transit control operation is used to control flowing of the yarn spindle product transiting the target workstation and/or control whether the yarn spindle product transits the target workstation.

By adopting the method for controlling transit of the yarn spindle provided in the embodiments of the present disclosure, on the one hand, centralized management and integration of the business data may be achieved using the first controller by taking the first controller as an intermediate layer between the plurality of second controllers and the MES, thereby reducing a data processing burden of the MES, enhancing scalability and security of the system for controlling transit of the yarn spindle, simplifying a network structure of the system for controlling transit of the yarn spindle, and improving stability of the system for controlling transit of the yarn spindle; on the other hand, since after receiving the target transit indication sent by the MES, the first controller sends the target transit indication to the target controller only in the case of determining that the communication link from the first controller to the target controller is in the normal state in this way, it can avoid the first controller sending the target transit indication to the target controller in a case where the communication link from the first controller to the target controller is in an abnormal state, which may cause damage or loss of the target transit indication, thereby ensuring that the target transit indication can be accurately received by the target controller, further ensuring that the target controller can accurately carry on the transit control operation for the yarn spindle product transiting the target workstation based on the target transit indication, that is, ensuring that the yarn spindle product can be efficiently and accurately flowed and/or making a decision on whether to release the yarn spindle product to the next spindle workstation when the yarn spindle product is transiting the yarn spindle workstation, in order to maintain efficiently operating of the assembly line.

In addition, it should be noted that, in the embodiments of the present disclosure, after receiving the target business data, the MES may determine a transit evaluation mechanism corresponding to the target business data based on a data attribute of the target business data, and obtain the target transit indication based on the target business data according to the transit evaluation mechanism.

For example, if the target business data is the yarn spindle external inspection result, the transit evaluation mechanism corresponding to the target business data may include obtaining a first transit indication in a case where the yarn spindle external inspection result represents that the yarn spindle product belongs to a S-level product (a transit control operation corresponding to the first transit indication is diverting the yarn spindle product from a main assembly line to a first assembly line); obtaining a second transit indication in a case where the yarn spindle external inspection result represents that the yarn spindle product belongs to an A-level product (a transit control operation corresponding to the second transit indication is diverting the yarn spindle product from the main assembly line to a second assembly line); and obtaining a third transit indication in a case where the yarn spindle external inspection result indicates that the yarn spindle product belongs to a B-level product (a transit control operation corresponding the third transit indication is diverting the yarn spindle product from the main assembly line to a third assembly line).

For another example, if the target business data is the yarn spindle weight, the transit evaluation mechanism corresponding to the target business data may include obtaining the first transit indication when the yarn spindle weight is within a preset weight range (the transit control operation corresponding to the first transit indication is allowing transit); obtaining the second transit indication when the yarn spindle weight exceeds the preset weight range (the transit control operation corresponding to the second transit indication is prohibiting transit). The preset weight range may be set according to actual application requirements, which is not limited by the embodiments of the present disclosure.

In some alternative implementations, the step S204, that is, "sending the target transit indication to the target controller in the case of determining that the communication link from the first controller to the target controller is in the normal state", may include:

updating a history heartbeat count value to obtain a current heartbeat count value;

generating a heartbeat data packet including the current heartbeat count value;

executing a heartbeat data sending instruction, which is used to instruct the first controller to send the heartbeat data packet to the target controller; and determining that the communication link from the first controller to the target controller is in the normal state, and sending the target transit indication to the target controller, in a case where the heartbeat data sending instruction has been successfully executed (that is, the heartbeat data packet is successfully sent to the target controller).

In the embodiments of the present disclosure, the history heartbeat count value may be updated in a case of satisfying a preset heartbeat sending requirement, to obtain the current heartbeat count value. The preset heartbeat sending requirement may include that a heartbeat sending mechanism is started (that is, HB_ENABLED=1) and a timing duration of a heartbeat timer is greater than or equal to a preset heartbeat interval (that is, HB_TIMER>=HB_INTERVAL).

In addition, in the embodiments of the present disclosure, the history heartbeat count value may be obtained by:

randomly generating a first heartbeat count value as the history heartbeat count value in a case where the first controller does not receive a heartbeat response data packet sent by the target controller; and obtaining the history heartbeat count value carried in the heartbeat response data packet in a case where the first controller receives the heartbeat response data packet sent by the target controller.

In an example, after receiving the history heartbeat count value, a "+1" operation may be carried on the history heartbeat count value to obtain the current heartbeat count value and generate the heartbeat data packet including the current heartbeat count value, then the heartbeat data sending instruction is executed to try to send the heartbeat data packet to the target controller, so as to determine the communication link from the first controller to the target controller is in the normal state in the case where the heartbeat data sending instruction has been successfully executed, and send the target transit indication to the target controller. The heartbeat data sending instruction is a "PUT" instruction. When the first controller sends the heartbeat data packet to the target controller through the communication link, a first state code (e.g., an Error state code) is set to 0, and when the first controller receives a heartbeat response data packet feedback from the target controller after sending the heartbeat data packet to the target controller through the communication link, a second state code (e.g., a Status state code) is set to 0. Based on this, in the embodiments of the present disclosure, the first state code and the second state code are obtained after executing the heartbeat data sending instruction, and it is determined that the heartbeat data sending instruction has been successfully executed in a case where both the first and second state codes are 0, and it is determined that the heartbeat data sending instruction has not been successfully executed in a case where at least one of the first and second state codes is not 0.

In addition, it should be noted that, in the embodiments of the present disclosure, after receiving the heartbeat data packet sent by the first controller, the target controller may obtain the current heartbeat count value carried in the heartbeat data packet and carry on the "+1" operation on the current heartbeat count value to obtain a new history heartbeat count value. Afterwards, a heartbeat response data packet including the new history heartbeat count value may be generated and sent to the first controller.

By above manners, in the embodiments of the present disclosure, the history heartbeat count value may be updated to obtain the current heartbeat count value and generate the heartbeat data packet including the current heartbeat count value, then the heartbeat data sending instruction is executed to determining that the communication link from the first controller to the target controller is in the normal state in the case where the heartbeat data sending instruction has been successfully executed. This kind of active probing mechanism can timely confirm the case where the communication link from the first controller to the target controller is in the normal state, thereby ensuring that the target transit indication can be timely sent to the target controller, reducing delay transmission of the target transit indication, and more effectively maintaining efficiently operating of the assembly line.

Furthermore, in the embodiments of the present disclosure, after determining that the communication link from the first controller to the target controller is in the normal state, the target transit indication may be firstly sent to the target controller, and then a heartbeat result flag bit is set (i.e., setting HB_OK=1). Alternatively, the heartbeat result flag bit is firstly set (i.e., setting HB_OK=1), and then target transit indication is sent to the target controller. Afterwards, the timing duration of the heartbeat timer is reset (that is, setting HB_TIMER=0).

In some alternative implementations, the heartbeat data sending instruction may be specifically used to instruct the first controller to respectively send the heartbeat data packet to the target controller through a plurality of candidate links. The plurality of candidate links may be communication links pre-established between the first controller and the target controller. In an example, the plurality of candidate links may include an Ethernet communication link, a serial communication link built based on a serial communication protocol, a wireless LAN communication link, a wireless sensor network link composed of distributed sensor nodes, and the like.

Based on the above contents, in above implementations, "sending the target transit indication to the target controller" may include:

selecting a candidate link with the best communication state from at least one candidate link through which the heartbeat data packet is successfully sent to the target controller, as a target link; and sending the target transit indication to the target controller through the target link.

As mentioned above, in the embodiments of the present disclosure, the heartbeat data sending instruction being successfully executed may be understood as successful sending of the heartbeat data packet to the target controller. Specifically, in the above implementations, as long as the first controller successfully sends the heartbeat data packet to the target controller through the at least one candidate link of the plurality of candidate links, it is considered that the heartbeat data sending instruction has been successfully executed, and in the case where the heartbeat data sending instruction has been successfully executed, it is determined that the communication link from the first controller to the target controller is in the normal state. Afterwards, the candidate link with the best communication state may be selected from the at least one candidate link through which the heartbeat data packet is successfully sent to the target controller, as the target link.

Furthermore, in an example, "selecting the candidate link with the best communication state from the at least one candidate link through which the heartbeat data packet is successfully sent to the target controller, as the target link" may include:

determining a plurality of evaluation indicators;

obtaining a plurality of target weights corresponding one-to-one with the plurality of evaluation indicators; and selecting the candidate link with the best communication state from the at least one candidate link through which the heartbeat data packet is successfully sent to the target controller as the target link based on the plurality of evaluation indicators and the plurality of target weights.

The plurality of evaluation indicators may include signal quality, communication delay, link bandwidth, and the like. Here, the signal quality may be used to characterize a bit error rate (BER), a signal-to-noise ratio (SNR) and the like of a communication signal transmitted over the candidate link. For each of the at least one candidate link, the communication delay of the candidate link may be a time difference between a first time point and a second time point, the first time point may be a time point when the first controller sends the heartbeat data packet to the target controller through the candidate link, and the second time point may be a time point when the first controller receives the heartbeat response data packet feedback from the target controller after sending the heartbeat data packet to the target controller through the candidate link. The link bandwidth may be used to characterize the maximum amount of data that can be transmitted at a single time on the candidate link.

In addition, in a specific example, the plurality of target weights corresponding one-to-one with the plurality of evaluation indicators may be set according to actual application needs, which is not limited in the embodiments of the present disclosure. In another specific example, the plurality of target weights corresponding one-to-one with the plurality of evaluation indicators may also be dynamically obtained. For example, the plurality of target weights corresponding one-to-one with the plurality of evaluation indicators may be dynamically obtained by:

obtaining a plurality of reference weights corresponding one-to-one with the plurality of evaluation indicators; and adjusting the plurality of reference weights respectively based on the target business data, to obtain the plurality of target weights corresponding one-to-one with the plurality of evaluation indicators.

The plurality of reference weights corresponding one-to-one with the plurality of evaluation indicators may be set according to actual application needs, which is not limited in the embodiments of the present disclosure.

After obtaining the plurality of reference weights corresponding one-to-one with the plurality of evaluation indicators, the plurality of reference weights may be adjusted respectively based on the target business data to obtain the plurality of target weights corresponding one-to-one with the plurality of evaluation indicators. Specifically, the device state and the production progress may be extracted from the target business data, and the plurality of reference weights may be adjusted respectively based on the device state and the production progress, to obtain the plurality of target weights corresponding one-to-one with the plurality of evaluation indicators.

For example, a reference weight corresponding to the signal quality is $4/10$, a reference weight corresponding to the communication delay is $3/10$, and a reference weight corresponding to the link bandwidth is $3/10$. In a case where the device state is poor and the production progress is slow, the reference weight corresponding to the signal quality may be increased to obtain a target weight corresponding to the signal quality, for example, $6/10$, and the reference weight corresponding to the communication delay may be used as a target weight corresponding to the communication delay, that is, the target weight corresponding to the communication delay may be obtained as $3/10$, and the reference weight corresponding to the link bandwidth may be decreased to obtain a target weight corresponding to the link bandwidth, for example, $1/10$. In a case where the device state is poor and the production progress is fast, the reference weight corresponding to the signal quality may be increased to obtain the target weight corresponding to the signal quality, for example, $6/10$, the reference weight corresponding to the communication delay may be decreased to obtain the target weight corresponding to the communication delay, for example, $2/10$, and the reference weight corresponding to the link bandwidth may be decreased to obtain the target weight corresponding to the link bandwidth, for example, $2/10$. In a case where the device state is good and the production progress is slow, the reference weight corresponding to the signal quality may be used as the target weight corresponding to the signal quality, that is, the target weight corresponding to the signal quality may be obtained as $4/10$, the reference weight corresponding to the communication delay may be increased to obtain the target weight corresponding to the communication delay, for example, $4/10$, and the reference weight corresponding to the link bandwidth may be decreased to obtain the target weight corresponding to the link bandwidth, for example, $2/10$. In a case where the device state is good and the production progress is fast, the reference weight corresponding to the signal quality may be used as the target weight corresponding to the signal quality, that is, the target weight corresponding to the signal quality may be obtained as $4/10$, the reference weight corresponding to the communication delay may be used as the target weight corresponding to the communication delay, that is, the target weight corresponding to the communication delay may be obtained as $3/10$, and the reference weight corresponding to the link bandwidth may be used as the target weight corresponding to the link bandwidth, that is, the target weight corresponding to the link bandwidth may be obtained as $3/10$.

The device state being poor may be due to an unstable operation state of the production control device (which may be specifically determined based on a temperature fluctuation condition, a voltage fluctuation condition, an error rate and the like of the production control device) and/or a large number of fault records (for example, a number of faults is greater than or equal to a threshold of a number of records). Conversely, the device state being good may be due to a stable operation state of the production control device (which may be specifically determined by the temperature fluctuation condition, the voltage fluctuation condition, the error rate and the like of the production control device) and fewer fault records (for example, the number of faults is less than the threshold of the number of records). The production progress being slow may be due to the current production statistical result not meeting a preset production requirement (e.g., the current production statistical result is less than a preset proportion threshold of a total production plan). Conversely, the production progress being fast may be due to the current production statistical result meeting the preset production requirement (e.g., the current production statistical result is greater than the preset proportion threshold of the total production plan). Here, the threshold of the number of records and the preset proportion threshold may be set according to actual application requirements, which are not limited in the embodiments of the present disclosure.

After determining the plurality of evaluation indicators and obtaining the plurality of target weights corresponding one-to-one with the plurality of evaluation indicators, the candidate link with the best communication state may be selected from the at least one candidate link through which the heartbeat data packet is successfully sent to the target controller as the target link based on the plurality of evaluation indicators and the plurality of target weights.

In a specific example, each of the at least one candidate link through which the heartbeat data packet is successfully sent to the target controller may be taken as a link to be evaluated, and the link to be evaluated is evaluated under the plurality of evaluation indicators, to obtain a plurality of evaluation result representation values related to the link to be evaluated. A state evaluation score of the link to be evaluated is obtained based on the plurality of evaluation result representation values related to the link to be evaluated and the plurality of target weights. For example, the state evaluation score of the link to be evaluated may be obtained through the following logic:

$$V = QA1 + DA2 + BA3.$$

Here, V is used to represent the state evaluation score of the link to be evaluated; Q is used to represent a first evaluation result representation value of the link to be evaluated under an evaluation indicator of the signal quality (the higher the first evaluation result representation value, the higher the signal quality of the link to be evaluated, and conversely, the lower the first evaluation result representation value, the lower the signal quality of the link to be evaluated); A1 is used to represent the target weight corresponding to the signal quality; D is used to represent a second evaluation result representation value of the link to be evaluated under an evaluation indicator of the communication delay (the higher the second evaluation result representation value, the shorter the communication delay of the link to be evaluated, and conversely, the lower the second evaluation result representation value, the longer the communication delay of the link to be evaluated); A2 is used to represent the target weight corresponding to the communication delay; B is used to represent a third evaluation result representation value of the link to be evaluated under an evaluation indicator of the link bandwidth (the higher the third evaluation result representation value, the larger the link bandwidth of the link to be evaluated, and conversely, the lower the third evaluation result representation value, the smaller the link bandwidth of the link to be evaluated); and A3 is used to represent the target weight corresponding to the link bandwidth.

After obtaining the state evaluation score of each of the at least one candidate link through which the heartbeat data packet is successfully sent to the target controller, the candidate link with the highest state evaluation score may be selected from the at least one candidate link through which the heartbeat data packet is successfully sent to the target controller as the candidate link with the best communication state, that is, the target link.

Through the above manners, in the embodiments of the present disclosure, it is possible to determine that the communication link from the first controller to the target controller is in the normal state in the case where the heartbeat data sending instruction has been successfully executed, and the candidate link with the best communication state may be selected from the at least one candidate link through which the heartbeat data packet is successfully sent to the target controller as the target link, and then the target transmit indication is sent to the target controller through the target link. In this way, it may further ensure that the target transit indication can be accurately received by the target controller, so that the target controller can accurately carry on the transit control operation for the yarn spindle product transiting the target workstation based on the target transit indication, that is, ensure that the yarn spindle product can flow efficiently and accurately and/or make the decision on whether to release the yarn spindle product to the next spindle workstation when the yarn spindle product is transiting the yarn spindle workstation, in order to maintain efficiently operating of the assembly line.

In some alternative implementations, the method for controlling transit of the yarn spindle may include:

generating an abnormity indication result in a case where the heartbeat data sending instruction has not been successfully executed, the abnormity indication result is used to represent that the communication link from the first controller to the target controller is in the abnormal state; and generating a single abnormity record based on the abnormity indication result.

The single abnormity record may be identified by an error code of 3573.

Through the above manners, in the embodiments of the present disclosure, the abnormity indication result may be generated when the heartbeat data sending instruction has not been successfully executed, to represent that the communication link from the first controller to the target controller is in the abnormal state, and the single abnormity record may be generated based on the abnormity indication result. In this way, when the single abnormity record is detected, it may be determined that there is a potential stability issue in the communication link from the first controller to the target controller, so as to take a corresponding measure to optimize the communication link from the first controller to the target controller.

In some alternative implementations, "generating the single abnormity record based on the abnormity indication result" may include:

obtaining a target timestamp corresponding to the abnormity indication result; and generating the single abnormity record based on the target timestamp.

In an example, the timestamp recorded by the first controller when executing the heartbeat data sending instruction corresponding to the abnormity indication result may be obtained as the target timestamp corresponding to the abnormity indication result, and the single abnormity record may be generated based on the target timestamp.

In a specific example, the single abnormity record may be generated based solely on the target timestamp. For example, the single abnormity record including the target timestamp is generated. For example, a first specified time period with the target timestamp as a midpoint and including first preset time lengths before and after the midpoint is generated as the single abnormity record. The first preset time lengths may be set according to actual application requirements, which is not limited in the embodiments of the present disclosure.

Based on the above examples, in the embodiments of the present disclosure, it is possible to determine that there may already have the potential stability issue in the communication link from the first controller to the target controller in a case of detecting the single abnormity record, and a work log of the first controller and a work log of the target controller are queried based on the target timestamp included in the single abnormity record, thereby accurately locating the potential stability issue already existed in the communication link from the first controller to the target controller in a timely manner, so as to take the corresponding measure to optimize the communication link from the first controller to the target controller.

In another specific example, the single abnormity record may also be generated by:

obtaining first query time based on the target timestamp;

obtaining first query contents; and generating the single abnormity record based on the first query time and the first query contents.

The first query time may be generated based solely on the target timestamp. For example, first query time including the target timestamp is generated. For example, a second specified time period with the target timestamp as the midpoint and including second preset time lengths before and after the midpoint is generated as the first query time. The second preset time lengths may be set according to actual application requirements, which is not limited in the embodiments of the present disclosure.

In addition, in the embodiments of the present disclosure, the first query contents may include at least one of a single communication data amount from the first controller to the target controller, a communication bandwidth of the first controller, and a communication bandwidth of the target controller.

Based on the above examples, in the embodiments of the present disclosure, it is possible to determine that there may already have the potential stability issue in the communication link from the first controller to the target controller in the case of detecting the single abnormity record, and a portion related to the single communication data amount from the first controller to the target controller and the communication bandwidth of the first controller in the work log of the first controller and a portion related to the communication bandwidth of the target controller in the work log of the target controller are queried based on the first query time included in the single abnormity record, thereby accurately locating the potential stability issue already existed in the communication link from the first controller to the target controller in a timely manner, so as to take the corresponding measure to optimize the communication link from the first controller to the target controller.

Furthermore, in the embodiments of the present disclosure, a first total quantity of single abnormity records that occur during a preset working period of controlling transit of the yarn spindle may be counted, and in a case where the first total quantity is greater than or equal to a first preset quantity threshold, a first operation and maintenance message may be generated and sent to a target object. The first operation and maintenance message may include the first total quantity and a first operation and maintenance suggestion. Here, the first operation and maintenance suggestion may include at least one of the single communication data amount from the first controller to the target controller, the communication bandwidth of the first controller, and the communication bandwidth of the target controller.

In some alternative implementations, the method for controller transit of the yarn spindle may further include:

updating a history abnormity number of times M based on the single abnormity record to obtain a current abnormity number of times M+1, M≥0 and is an integer, the current abnormity number of times M+1 is used to represent that M+1 single abnormity records have been generated, and the M+1 single abnormity records correspond one-to-one with M+1 abnormity indication results; and generating a continuous abnormity record based on the M+1 single abnormity records in a case where the current abnormity number of times M+1 is greater than or equal to a preset number of times threshold.

Here, the history abnormity number of times M may be obtained by:

determining the history abnormity number of times M is 0, in a case where a single abnormity number of times storage space is empty, and determining a single abnormity number of times value stored in the single abnormity number of times storage space as the history abnormity number of times M, in a case where the single abnormity number of times storage space is not empty.

In an example, after obtaining the history abnormity number of times M, the "+1" operation may be carried on the history abnormity number of times M to obtain the current abnormity number of times M+1, and in the case where the current abnormity number of times M+1 is greater than or equal to the preset number of times threshold, the continuous abnormity record is generated based on the M+1 single abnormity records. Here, the continuous abnormity record may be identified by an error code of 3307.

It may be understood that, in the embodiments of the present disclosure, when updating the history abnormity number of times M based on the single abnormity record to obtain the current abnormity number of times M+1, the current abnormity number of times M+1 may also be used as a new single abnormity number of times value for being stored in the single abnormity number of times storage space to overwrite the old single abnormity number of times value stored in the single abnormity number of times value storage space with the new single abnormity number of times value.

In addition, in the embodiments of the present disclosure, the preset number of times threshold may be set according to actual application requirements, for example, it may be set to 3, which is not limited by the embodiments of the present disclosure.

By above manners, in the embodiments of the present disclosure, the history abnormity number of times M may be updated based on the single abnormity record to obtain the current abnormity number of times M+1, and the continuous abnormity record is generated based on the M+1 single abnormity records in the case where the current abnormity number of times M+1 is greater than or equal to the preset number of times threshold. In this way, in a case of detecting generation of the continuous abnormity record, it may be determined that a stability issue has already existed in the communication link from the first controller to the target controller, so as to take the corresponding measure to optimize the communication link from the first controller to the target controller.

Furthermore, in the embodiments of the present disclosure, after updating the history abnormity number of times M based on the single abnormity record to obtain the current abnormity number of times M+1, and after generating the continuous abnormity record based on the M+1 single abnormity records in the case where the current abnormity number of times M+1 is greater than or equal to the preset number of times threshold, it may firstly generate the continuous abnormity record based on the M+1 single abnormity records, then reset the heartbeat result flag bit (that is, setting HB_OK=0), or, it may firstly reset the heartbeat result flag bit (that is, setting HB_OK=0), then generate the continuous abnormity record based on the M+1 single abnormity records.

In addition, it should be noted that, in the embodiments of the present disclosure, after updating the history abnormity number of times M based on the single abnormity record to obtain the current abnormity number of times M+1, the heartbeat data sending instruction may continue to be executed when the current abnormity number of times M+1 is less than the preset number of times threshold.

In some alternative implementations, "generating the continuous abnormity record based on the M+1 single abnormity records" may include:

obtaining second query time based on the M+1 abnormity indication results corresponding to the M+1 single abnormity records;

obtaining second query contents; and generating the continuous abnormity record based on the second query time and the second query contents.

In the embodiments of the present disclosure, each of the M+1 abnormity indication results corresponding to the M+1 single abnormity records may be taken as a target indication result, and a timestamp recorded by the first controller when executing the heartbeat data sending instruction corresponding to the target indication result is obtained as a target timestamp corresponding to the target indication result, so as to obtain M+1 target timestamps corresponding one-to-one with the M+1 abnormity indication results. Based on this, in the embodiments of the present disclosure, a first standby timestamp which is the earliest and a second standby timestamp which is the latest may be determined from the M+1 target timestamps, and a specified time period may be formed with the first standby timestamp as a starting time point and the second standby timestamp as an ending time point, as the second query time.

In addition, in the embodiments of the present disclosure, the second query contents may include a workload of the first controller.

Based on the above examples, in the embodiments of the present disclosure, it is possible to determine that stability issue has already existed in the communication link from the first controller to the target controller when the continuous abnormity record is detected, and based on the second query time included in the continuous abnormity record, the work log of the first controller is queried for a portion related to the workload of the first controller, so as to accurately locate the stability issue that has already existed in the communication link from the first controller to the target controller in a more timely manner, and take the corresponding measure to optimize the communication link from the first controller to the target controller.

Furthermore, in the embodiments of the present disclosure, a second total quantity of continuous abnormity records that occur during the preset working period of controlling transit of the yarn spindle may be counted, and in a case where the second total quantity is greater than or equal to a second preset quantity threshold, a second operation and maintenance message may be generated and sent to the target object. The second operation and maintenance message may include the second total quantity and a second operation and maintenance suggestion. Here, the second operation and maintenance suggestion may include the workload of the first controller to indicate a need of adding the first controller.

Figure 3:
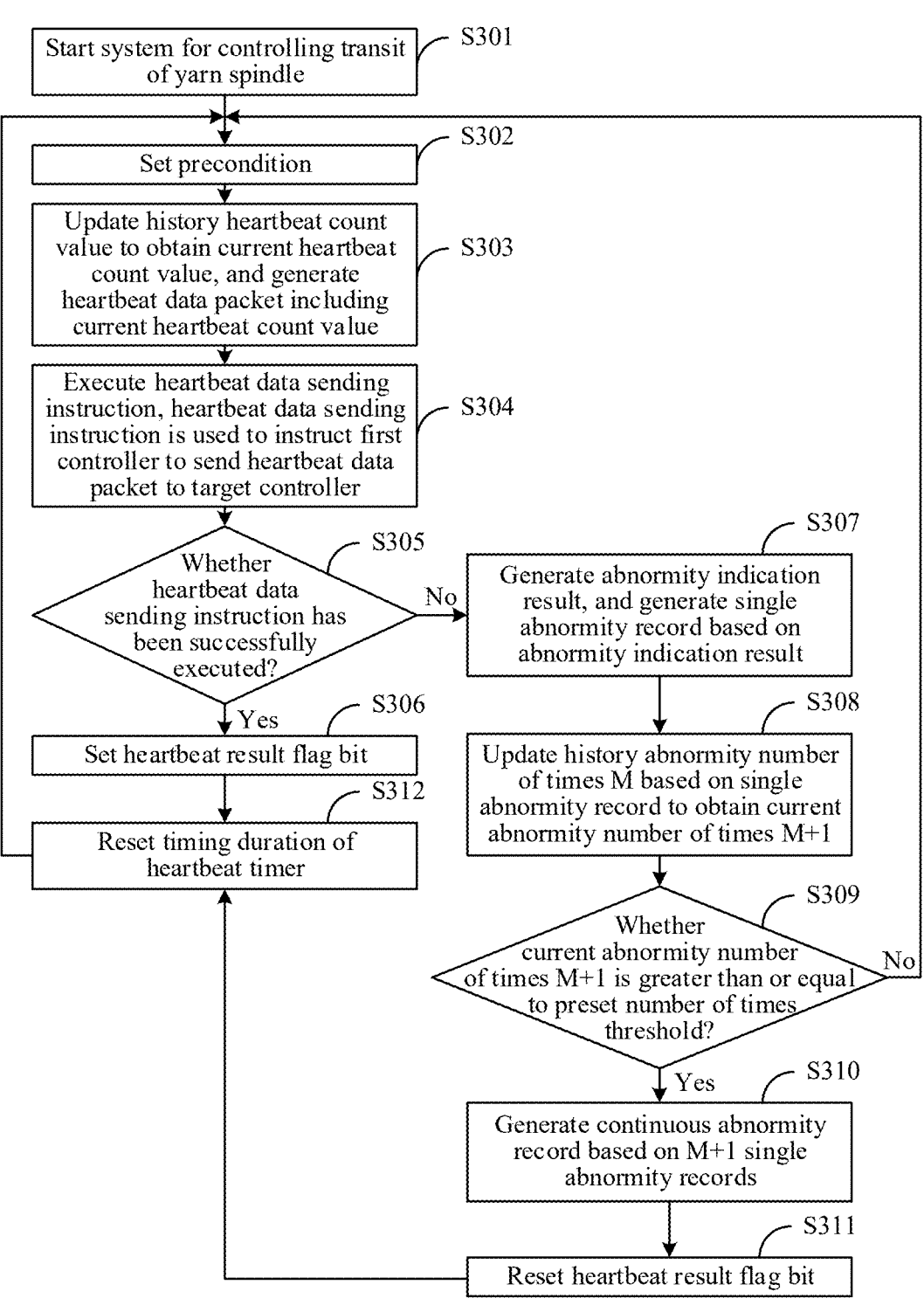
FIG. 3 is a schematic diagram of partial processes involved in a method for controlling transit of a yarn spindle provided by embodiments of the present disclosure.

Hereinafter, partial processes involved in the method for controlling transit of the yarn spindle provided by embodiments of the present disclosure will be explained further in combination with FIG. 3.

At step S301, the system for controlling transit of the yarn spindle is started.

At step S302, a precondition is set.

In the embodiments of the present disclosure, the precondition includes the preset heartbeat sending requirement, which includes that the heartbeat sending mechanism is started (that is, HB_ENABLED=1) and the timing duration of the heartbeat timer is greater than or equal to the preset heartbeat interval (that is, HB_TIMER>=HB_INTERVAL).

At step S303, the history heartbeat count value is updated to obtain the current heartbeat count value, and the heartbeat data packet including the current heartbeat count value is generated.

In the embodiments of the present disclosure, the history heartbeat count value may be obtained by:

randomly generating the first heartbeat count value as the history heartbeat count value in the case where the first controller does not receive the heartbeat response data packet sent by the target controller; and obtaining the history heartbeat count value carried in the heartbeat response data packet in the case where the first controller receives the heartbeat response data packet sent by the target controller.

In an example, after receiving the history heartbeat count value, the "+1" operation may be carried on the history heartbeat count value to obtain the current heartbeat count value and generate the heartbeat data packet including the current heartbeat count value.

In addition, it should be noted that, in the embodiments of the present disclosure, after receiving the heartbeat data packet sent by the first controller, the target controller may obtain the current heartbeat count value carried in the heartbeat data packet and carry on the "+1" operation on the current heartbeat count value to obtain the new history heartbeat count value. Afterwards, the heartbeat response data packet including the new history heartbeat count value may be generated and sent to the first controller.

At step S304, the heartbeat data sending instruction is executed.

The heartbeat data sending instruction is used to instruct the first controller to send the heartbeat data packet to the target controller. The heartbeat data sending instruction is the "PUT" instruction.

At step S305, whether the heartbeat data sending instruction has been successfully executed is determined.

As described above, in the embodiments of the present disclosure, the heartbeat data sending instruction is the "PUT" instruction. Based on this, in the embodiments of the present disclosure, the first state code (e.g., the Error state code) and the second state code (e.g., the Status state code) are obtained after executing the heartbeat data sending instruction, and it is determined that the heartbeat data sending instruction has been successfully executed in the case where both the first and second state codes are 0, and it is determined that the heartbeat data sending instruction has not been successfully executed in the case where at least one of the first and second state codes is not 0.

In the embodiments of the present disclosure, in the case where the heartbeat data sending instruction has been successfully executed, it may be determined that the communication link from the first controller to the target controller is in the normal state, and step S306 will be performed, and in the case where the heartbeat data sending instruction has not been successfully executed, it may be determined that the communication link from the first controller to the target controller is in the abnormal state, and step S307 will be performed.

Furthermore, in the embodiments of the present disclosure, the first controller may take each of the plurality of second controllers as the target controller, and receive the target business data sent by the target controller, and then send the target business data to the MES. The MES is used to obtain the target transit indication based on the target business data, and send the target transit indication to the first controller. Afterwards, the first controller may receive the target transit indication sent by MES and send the target transit indication to the target controller in the case where it is determined that the communication link from the first controller to the target controller is in the normal state. The target controller is used to perform the transit control operation for yarn spindle product transiting the target workstation based on the target transit indication. Here, the transit control operation may be achieved through the transit control device set at the target workstation corresponding to the target controller, and the transit control operation is used to control the flow of the yarn spindle product and/or control whether the yarn spindle product transits the target workstation.

At step S306, the heartbeat result flag bit is set (i.e., setting HB_OK=1).

In the embodiments of the present disclosure, after performing the step S306, step S312 will be performed.

At step S307, the abnormity indication result is generated, and the single abnormity record is generated based on the abnormity indication result.

The abnormity indication result is used to represent that the communication link from the first controller to the target controller is in the abnormal state, and the single abnormity record may be identified by an error code of 3573.

In some alternative implementations, "generating the single abnormity record based on the abnormity indication result" may include:

obtaining the target timestamp corresponding to the abnormity indication result; and generating the single abnormity record based on the target timestamp.

In an example, the timestamp recorded by the first controller when executing the heartbeat data sending instruction corresponding to the abnormity indication result may be obtained as the target timestamp corresponding to the abnormity indication result, and the single abnormity record may be generated based on the target timestamp.

In a specific example, the single abnormity record may be generated based solely on the target timestamp. For example, the single abnormity record including the target timestamp is generated. For another example, the first specified time period with the target timestamp as the midpoint and including the first preset time lengths before and after the midpoint is generated as the single abnormity record. The first preset time lengths may be set according to actual application requirements, which is not limited in the embodiments of the present disclosure.

In another specific example, the single abnormity record may also be generated by:

obtaining the first query time based on the target timestamp;

obtaining the first query contents; and generating the single abnormity record based on the first query time and the first query contents.

The first query time may be generated based solely on the target timestamp. For example, the first query time including the target timestamp is generated. For another example, the second specified time period with the target timestamp as the midpoint and including the second preset time lengths before and after the midpoint is generated as the first query time. The second preset time lengths may be set according to actual application requirements, which is not limited in the embodiments of the present disclosure.

In addition, in the embodiments of the present disclosure, the first query contents may include at least one of the single communication data amount from the first controller to the target controller, the communication bandwidth of the first controller, and the communication bandwidth of the target controller.

At step S308, the history abnormity number of times M is updated based on the single abnormity record to obtain the current abnormity number of times M+1.

Here, the history abnormity number of times M may be obtained by:

determining the history abnormity number of times M is 0, in the case where the single abnormity number of times storage space is empty, and determining the single abnormity number of times value stored in the single abnormity number of times storage space as the history abnormity number of times M, in the case where the single abnormity number of times storage space is not empty.

In an example, after obtaining the history abnormity number of times M, the "+1" operation may be carried on the history abnormity number of times M to obtain the current abnormity number of times M+1.

It may be understood that, in the embodiments of the present disclosure, when updating the history abnormity number of times M based on the single abnormity record to obtain the current abnormity number of times M+1, the current abnormity number of times M+1 may also be used as the new single abnormity number of times value for being stored in the single abnormity number of times storage space to overwrite the old single abnormity number of times value stored in the single abnormity number of times value storage space with the new single abnormity number of times value.

At step S309, whether the current abnormity number of times M+1 is greater than or equal to the preset number of times threshold is determined.

Here, the preset number of times threshold may be set according to actual application requirements, for example, may be set as 3, and is not limited by the embodiments of the present disclosure.

In the embodiments of the present disclosure, in the case where the current abnormity number of times M+1 is greater than or equal to the preset number of times threshold, step S310 will be performed, and in the case where the current abnormity number of times M+1 is smaller than the preset number of times threshold, the step S304 will be returned.

At step S310, the continuous abnormity record is generated based on the M+1 single abnormity records.

The continuous abnormity record may be identified by an error code of 3307.

In some alternative implementations, "generating the continuous abnormity record based on the M+1 single abnormity records" may include:

obtaining the second query time based on the M+1 abnormity indication results corresponding to the M+1 single abnormity records;

obtaining the second query contents; and generating the continuous abnormity record based on the second query time and the second query contents.

In the embodiments of the present disclosure, each of the M+1 abnormity indication results corresponding to the M+1 single abnormity records may be taken as the target indication result, and the timestamp recorded by the first controller when executing the heartbeat data sending instruction corresponding to the target indication result is obtained as the target timestamp corresponding to the target indication result, so as to obtain the M+1 target timestamps corresponding one-to-one with the M+1 abnormity indication results. Based on this, in the embodiments of the present disclosure, the first standby timestamp which is the earliest and the second standby timestamp which is the latest may be determined from the M+1 target timestamps, and the specified time period may be formed with the first standby timestamp as the starting time point and the second standby timestamp as the ending time point, as the second query time.

In addition, in the embodiments of the present disclosure, the second query contents may include the workload of the first controller.

At step S311, the heartbeat result flag bit is reset (i.e., setting HB_OK=0).

At step S312, the timing duration of the heartbeat timer is reset (i.e., setting HB_TIMER=0).

In the embodiments of the present disclosure, after performing the step S312, that is, resetting the timing duration of the heartbeat timer (i.e., setting HB_TIMER=0), the step S302 will be returned.

In order to better implement the above method for controlling transit of the yarn spindle, the embodiments of the present disclosure further provide an apparatus for controlling transit of the yarn spindle, which is applied to the first controller included in the system for controlling transit of the yarn spindle. Hereinafter, the apparatus for controlling transit of the yarn spindle 400 provided by the embodiments of the present disclosure will be explained in combination with FIG. 4.

The apparatus for controlling transit of the yarn spindle 400 includes:

a business data receiving unit 401 configured to take each of the plurality of second controllers as the target controller, and receive the target business data sent by the target controller;

a business data sending unit 402 configured to send the target business data to the MES; the MES is configured to obtain the target transit indication based on the target business data, and send the target transit indication to the first controller;

a transit indication receiving unit 403 configured to receive the target transit indication sent by the MES; and a transit indication sending unit 404 configured to send the target transit indication to the target controller in the case of determining that the communication link from the first controller to the target controller is in the normal state; the target controller is configured to carry on the transit control operation for the yarn spindle product transiting the target workstation based on the target transit indication.

In some alternative implementations, the transit indication sending unit 404 is configured to:

update the history heartbeat count value to obtain the current heartbeat count value;

generate the heartbeat data packet including the current heartbeat count value;

execute the heartbeat data sending instruction, which is used to instruct the first controller to send the heartbeat data packet to the target controller; and determine that the communication link from the first controller to the target controller is in the normal state, and send the target transit indication to the target controller, in the case where the heartbeat data sending instruction has been successfully executed.

In some alternative implementations, the heartbeat data sending instruction is used to instruct the first controller to send the heartbeat data packet to the target controller through the plurality of candidate links.

The transit indication sending unit 404 is configured to:

determine that the communication link from the first controller to the target controller is in the normal state, in the case where the heartbeat data sending instruction has been successfully executed;

select the candidate link with the best communication state from the at least one candidate link through which the heartbeat data packet is successfully sent to the target controller, as the target link; and send the target transit indication to target controller through the target link.

In some alternative implementations, the transit indication sending unit 404 is configured to:

determine the plurality of evaluation indicators;

obtain the plurality of target weights corresponding one-to-one with the plurality of evaluation indicators; and select the candidate link with the best communication state from the at least one candidate link through which the heartbeat data packet is successfully sent to the target controller as the target link based on the plurality of evaluation indicators and the plurality of target weights.

In some alternative implementations, the transit indication sending unit 404 is configured to:

obtain the plurality of reference weights corresponding one-to-one with the plurality of evaluation indicators; and adjusting the plurality of reference weights respectively based on the target business data, to obtain the plurality of target weights corresponding one-to-one with the plurality of evaluation indicators.

In some alternative implementations, the apparatus for controlling transit of the yarn spindle 400 further includes a single abnormity record generating unit configured to:

generate the abnormity indication result in the case where the heartbeat data sending instruction has not been successfully executed; the abnormity indication result is used to represent that the communication link from the first controller to the target controller is in the abnormal state; and generate the single abnormity record based on the abnormity indication result.

In some alternative implementations, the single abnormity record generating unit is configured to:

obtain the target timestamp corresponding to the abnormity indication result; and generate the single abnormity record based on the target timestamp.

In some alternative implementations, the single abnormity record generating unit is configured to:

obtain the first query time based on the target timestamp;

obtain the first query contents; and generate the single abnormity record based on the first query time and the first query contents.

In some alternative implementations, the first query contents may include at least one of the single communication data amount from the first controller to the target controller, the communication bandwidth of the first controller, and the communication bandwidth of the target controller.

In some alternative implementations, the apparatus for controlling transit of the yarn spindle 400 further includes a continuous abnormity record generating unit configured to:

update the history abnormity number of times M based on the single abnormity record to obtain the current abnormity number of times M+1, M≥0 and is an integer, the current abnormity number of times is used to represent that the M+1 single abnormity records have been generated, and the M+1 single abnormity records correspond one-to-one with the M+1 abnormity indication results; and generate the continuous abnormity record based on the M+1 single abnormity records in a case where the current abnormity number of times M+1 is greater than or equal to the preset number of times threshold.

In some alternative implementations, the continuous abnormity record generating unit is configured to:

obtain the second query time based on the M+1 abnormity indication results corresponding to the M+1 single abnormity records;

obtain the second query contents; and generate the continuous abnormity record based on the second query time and the second query contents.

In some alternative implementations, the second query contents may include the workload of the first controller.

The descriptions to specific functions and examples of each unit of the apparatus for controlling transit of the yarn spindle 400 provided by the embodiments of the present disclosure may refer to the relevant descriptions to the corresponding steps in the above method embodiments, which will not be repeated herein.

In the technical solution of the present disclosure, acquisition, storage and application of the user's personal information involved are all in compliance with provisions of relevant laws and regulations, and do not violate public order and good customs.

Figures 4, 5:
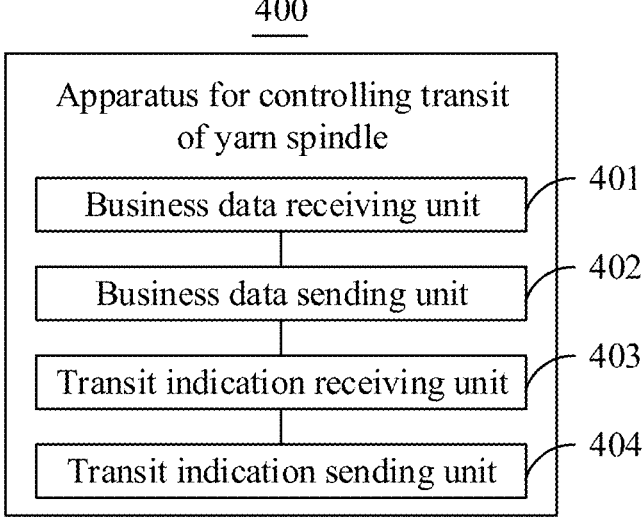
FIG. 4 is a schematic structural block diagram of an apparatus for controlling transit of a yarn spindle provided by embodiments of the present disclosure.
FIG. 5 is a schematic structural block diagram of an electronic device provided by embodiments of the present application.

FIG. 5 is a schematic structural block diagram of an electronic device according to the embodiments of the present application. As shown in FIG. 5, the electronic device includes a memory 510 and a processor 502, a computer program capable of being run on the processer 502 is stored in the memory 501. The number of each of the memory 501 and processor 502 may be one or more. The memory 501 may store one or more computer programs, which, when the one or more computer programs are executed by the electronic device, cause the electronic device performs the method provided in the above method embodiments. The electronic device may also include a communication interface 503 configured to communicate with an external device for carrying out data interactive transmission.

If the memory 501, the processor 502 and the communication interface 503 are implemented independently, the memory 501, the processor 502 and the communication interface 503 may be connected to each other and complete communication with each other through a bus. The bus may be an Industry Standard Architecture (ISA) bus, a Peripheral Component Interconnect (PCI) bus, an Extended Industry Standard Architecture (EISA) bus or the like. The bus may be divided into an address bus, a data bus, a control bus and the like. For ease of representation, the bus is shown by only one thick line in FIG. 5, which does not mean that there is only one bus or one type of bus.

Alternatively, in specific implementation, if the memory 501, the processor 502 and the communication interface 503 are integrated on one chip, the memory 501, the processor 502 and the communication interface 503 may complete communication with each other through internal interfaces.

It should be understood that the above processor may be a central processing unit (CPU), or may be another general-purpose processor, a digital signal processing (DSP), an application specific integrated circuit (ASIC), a field programmable gate array (FPGA) or another programmable logic device, a discrete gate or a transistor logic device, a discrete hardware component, or the like. The general-purpose processor may be a microprocessor or any conventional processor, etc. It is worth noting that the processor may be a processor that supports the Advanced RISC Machines (ARM) architecture.

Furthermore, alternatively, the above memory may include a read-only memory and a random-access memory, and may also include a non-volatile random access memory. The memory may be either a volatile memory or a non-volatile memory, or it may include both the volatile and non-volatile memories. Where the non-volatile memory may include a read-only memory (ROM), a programmable ROM (PROM), an erasable programmable PROM (EPROM), an electrically erasable programmable ROM (EEPROM), or a flash memory. The volatile memory may include a random access memory (RAM), which is used as an external cache. With illustrative but not restrictive illustrations, many forms of RAM are available, for example, a static RAM (SRAM), a dynamic ROM (DRAM), a synchronous DRAM (SDRAM), a double data date SDRAM (DDR SDRAM), an enhanced SDRAM (ESDRAM), a Synchlink DRAM (SL-DRAM) and a direct RAMBUS RAM (DR RAM).

In the above embodiments, it may be realized in whole or in part by software, hardware, firmware, or any combination thereof. When implemented using software, it may be implemented in whole or in part in a form of a computer program product. The computer program product includes one or more computer instructions. When the computer instructions are loaded and executed on a computer, a process or function described in the embodiments of the present disclosure is produced in whole or in part. The computer may be a general-purpose computer, a specialized computer, a computer network, or another programmable apparatus. The computer instructions may be stored in a computer-readable storage medium, or transmitted from a computer-readable storage medium to another computer-readable storage medium, for example, the computer instructions may be transmitted from a website site, computer, server or data center to another website site, computer, computer, server or data center by a wired (e.g., coaxial cable, optical fiber, data subscriber line (DSL)) or wireless (e.g., infrared, Bluetooth, microwave, etc.) manner. The computer-readable storage medium may be any available medium that the computer can access, or may be a data storage device such as a server, a data center, etc., which is integrated with one or more available medium. The available medium may be magnetic medium (e.g., floppy disk, hard disk, magnetic tape), optical medium (e.g., digital versatile disc (DVD)) or semiconductor medium (e.g., solid state disk (SSD)) and the like. It should note that the computer-readable storage medium referred to in the present disclosure may be non-volatile storage medium, in other words, non-transient storage medium.

Those having ordinary skills in the art may understand that all or part of the steps to realize the above embodiments may be completed by hardware, or by instructing related hardware by a program, and the program may be stored in a computer-readable storage medium, and the storage medium mentioned above may be a read-only memory, a disk or an optical disc, etc.

In descriptions to the embodiments of the present disclosure, descriptions referring to terms "an embodiment", "some embodiments", "an example", "a specific example", or "some examples" or the like mean that specific features, structures, materials, or features described in the embodiment(s) or example(s) are included in at least one embodiment or example of the present disclosure. Furthermore, the specific features, structures, materials, or features described may be combined in an appropriate manner in any one or more embodiments or examples. In addition, without contradicting each other, those having skills in the art may combine and integrate different embodiments or examples described in this Description and features of the different embodiments or examples.

In the descriptions to the embodiments of the present disclosure, unless otherwise indicated, "/" means "or", for example, A/B may mean A or B. The word "and/or" herein is merely an associated relationship for describing associated objects, which indicates that there may be three kinds of relationships, for example, A and/or B may mean that there are three cases: A alone, both A and B, and B alone.

In the descriptions to the embodiments of the present disclosure, terms "first", "second" and "third" are used only for a descriptive purpose and should not be construed as indicating or implying relative importance or implying the number of technical features indicated. Thus, features defined with the terms "first", "second" and "third may explicitly or implicitly include one or more of these features. In the descriptions to the embodiments of the present disclosure, unless otherwise specified, "a/the plurality of" means two or more of them.

The foregoing is only exemplary embodiments of the present disclosure, but is not used to limit the present disclosure, and all changes, substitutions and improvements within the scope of the present disclosure should be included in the protection scope of the present disclosure.

What is claimed is:

1. A method for controlling transit of yarn spindles, applied to a first controller comprised in a system for controlling the transit of the yarn spindles, the system for controlling the transit of the yarn spindles further comprises a manufacturing execution system in communication with the first controller and a plurality of second controllers; and the method comprises:

determining each of the plurality of second controllers as a target controller, wherein the target controller is configured to carry on a transit control operation for a yarn spindle of the yarn spindles transiting a target workstation corresponding to the target controller based on a target transit indication;

receiving target business data sent by the target controller;

sending the target business data to the manufacturing execution system; wherein the manufacturing execution system is configured to obtain the target transit indication based on the target business data, and send the target transit indication to the first controller;

receiving the target transit indication sent by the manufacturing execution system;

determining that a communication link from the first controller to the target controller is in a normal state, by: updating, generating, and executing in a case where the first controller receives a heartbeat response data packet feedback from the target controller through the communication link from the first controller to the target controller, wherein the updating is of a history heartbeat count value to obtain a current heartbeat count value;

wherein the generating is of a heartbeat data packet including the current heartbeat count value;

wherein the executing is of a heartbeat data sending instruction, wherein the communication link from the first controller to the target controller comprises a plurality of candidate links, and the heartbeat data sending instruction is used to instruct the first controller to respectively send the heartbeat data packet to the target controller through the plurality of candidate links; and sending the target transit indication to the target controller by selecting through a target link:

wherein the selecting is of a candidate link with a best communication state, from at least one candidate link of the plurality of candidate links, as the target link.

2. The method of claim 1, wherein the selecting of the candidate link with the best communication state from the at least one candidate link of the plurality of candidate links, as the target link, comprises:

determining a plurality of evaluation indicators;

obtaining a plurality of target weights corresponding one-to-one with the plurality of evaluation indicators; and selecting the candidate link with the best communication state from the at least one candidate link of the plurality of candidate links as the target link, based on the plurality of evaluation indicators and the plurality of target weights.

3. The method of claim 2, wherein the obtaining of the plurality of target weights corresponding one-to-one with the plurality of evaluation indicators comprises:

obtaining a plurality of reference weights corresponding one-to-one with the plurality of evaluation indicators; and adjusting the plurality of reference weights respectively based on the target business data, to obtain the plurality of target weights corresponding one-to-one with the plurality of evaluation indicators.

4. An electronic device, comprised in a system for controlling transit of yarn spindles, the system for controlling the transit of the yarn spindles further comprises a manufacturing execution system in communication with the electronic device and a plurality of controllers;

wherein the electronic device comprises:

at least one processor; and a memory connected in communication with the at least one processor, wherein the memory stores an instruction executable by the at least one processor, and the instruction, when executed by the at least one processor, enables the at least one processor to execute:

determining each of the plurality of controllers as a target controller, wherein the target controller is configured to carry on a transit control operation for a yarn spindle of the yarn spindles transiting a target workstation corresponding to the target controller based on a target transit indication;

receiving target business data sent by the target controller;

sending the target business data to the manufacturing execution system; wherein the manufacturing execution system is configured to obtain the target transit indication based on the target business data, and send the target transit indication to the electronic device;

receiving the target transit indication sent by the manufacturing execution system;

determining that a communication link from the electronic device to the target controller is in a normal state, by: updating, generating, and executing in a case where the first controller receives a heartbeat response data packet feedback from the target controller through the communication link from the first controller to the target controller, wherein the updating is of a history heartbeat count value to obtain a current heartbeat count value;

wherein the generating is of a heartbeat data packet including the current heartbeat count value;

wherein the executing is of a heartbeat data sending instruction, wherein the communication link from the electronic device to the target controller comprises a plurality of candidate links, and the heartbeat data sending instruction is used to instruct the electronic device to respectively send the heartbeat data packet to the target controller through the plurality of candidate links; and sending the target transit indication to the target controller by selecting through a target link:

wherein the selecting is of a candidate link with a best communication state, from at least one candidate link of the plurality of candidate links, as the target link.

5. The electronic device of claim 3, wherein the instruction, when executed by the at least one processor, enables the at least one processor to execute the selecting of the candidate link with the best communication state from the at least one candidate link of the plurality of candidate links, as the target link, by:

determining a plurality of evaluation indicators;

obtaining a plurality of target weights corresponding one-to-one with the plurality of evaluation indicators; and selecting the candidate link with the best communication state from the at least one candidate link of the plurality of candidate links as the target link based on the plurality of evaluation indicators and the plurality of target weights.

6. The electronic device of claim 5, wherein the obtaining of the plurality of target weights corresponding one-to-one with the plurality of evaluation indicators comprises:

obtaining a plurality of reference weights corresponding one-to-one with the plurality of evaluation indicators; and adjusting the plurality of reference weights respectively based on the target business data, to obtain the plurality of target weights corresponding one-to-one with the plurality of evaluation indicators.

7. A non-transitory computer-readable storage medium storing a computer instruction thereon, applied to a first controller comprised in a system for controlling transit of yarn spindles, the system for controlling the transit of the yarn spindles further comprises a manufacturing execution system in communication with the first controller and a plurality of second controllers;

wherein the computer instruction is used to cause a computer to execute:

determining each of the plurality of second controllers as a target controller, wherein the target controller is configured to carry on a transit control operation for a yarn spindle of the yarn spindles transiting a target workstation corresponding to the target controller based on a target transit indication;

receiving target business data sent by the target controller;

sending the target business data to the manufacturing execution system; wherein the manufacturing execution system is configured to obtain the target transit indication based on the target business data, and send the target transit indication to the first controller;

receiving the target transit indication sent by the manufacturing execution system;

determining that a communication link from the first controller to the target controller is in a normal state, by: updating, generating, and executing in a case where the first controller receives a heartbeat response data packet feedback from the target controller through the communication link from the first controller to the target controller, wherein the updating is of a history heartbeat count value to obtain a current heartbeat count value;

wherein the generating is of a heartbeat data packet including the current heartbeat count value;

wherein the executing is of a heartbeat data sending instruction, wherein the communication link from the first controller to the target controller comprises a plurality of candidate links, and the heartbeat data sending instruction is used to instruct the first controller to respectively send the heartbeat data packet to the target controller through the plurality of candidate links; and determining that the communication link from the first controller to the target controller is in the normal state, in a case where the first controller receives a heartbeat response data packet feedback from the target controller through the communication link from the first controller to the target controller; and sending the target transit indication to the target controller by selecting through a target link:

wherein the selecting is of a candidate link with a best communication state, from at least one candidate link of the plurality of candidate links, as the target link.

8. The non-transitory computer-readable storage medium of claim 7, wherein the computer instruction is used to cause the computer to execute the selecting of the candidate link with the best communication state from the at least one candidate link of the plurality of candidate links, as the target link, by:

determining a plurality of evaluation indicators;

obtaining a plurality of target weights corresponding one-to-one with the plurality of evaluation indicators; and selecting the candidate link with the best communication state from the at least one candidate link of the plurality of candidate links as the target link, based on the plurality of evaluation indicators and the plurality of target weights.

9. The non-transitory computer-readable storage medium of claim 8, wherein the obtaining of the plurality of target weights corresponding one-to-one with the plurality of evaluation indicators comprises:

obtaining a plurality of reference weights corresponding one-to-one with the plurality of evaluation indicators; and adjusting the plurality of reference weights respectively based on the target business data, to obtain the plurality of target weights corresponding one-to-one with the plurality of evaluation indicators.

\* \* \* \* \*